Figure 4:
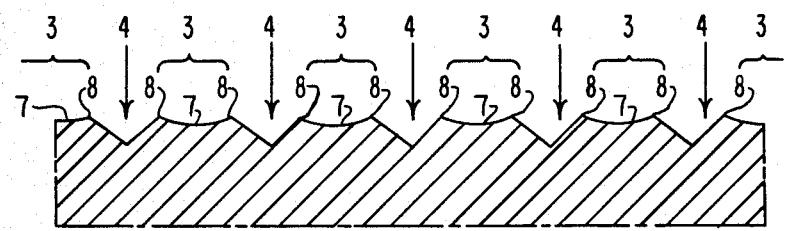

United States Patent [19]

Overhues

[11] Patent Number: 4,710,081
[45] Date of Patent: Dec. 1, 1987

[54] SELF-LOCKING RESILIENT OR NON-RESILIENT ELEMENT

[75] Inventor: Egon Overhues, Neuenrade, Fed. Rep. of Germany

[73] Assignee: Vossloh-Werke GmbH, Werdohl, Fed. Rep. of Germany

[21] Appl. No.: 863,442

[22] Filed: May 15, 1986

[30] Foreign Application Priority Data

May 31, 1985 [DE] Fed. Rep. of Germany ....... 3519610

[51] Int. Cl.$^4$ .............................................. F16B 39/24
[52] U.S. Cl. .................................... 411/161; 411/188; 411/958
[58] Field of Search ............... 411/160, 161, 162, 163, 411/164, 165, 186, 187, 188, 189, 332, 957, 959, 958, 154

[56] References Cited

U.S. PATENT DOCUMENTS

| | | | |
|---|---|---|---|
| 605,788 | 6/1898 | Johnson | 411/958 X |
| 3,078,889 | 2/1963 | MacLean et al. | 411/959 X |
| 3,752,203 | 8/1973 | Hill | 411/959 |
| 4,290,469 | 9/1981 | Nakae | 411/188 X |
| 4,309,139 | 1/1982 | Nakae | 411/187 |
| 4,518,295 | 5/1985 | Barth | 411/187 X |

FOREIGN PATENT DOCUMENTS

| | | |
|---|---|---|
| 3042388 | 12/1982 | Fed. Rep. of Germany . |
| 993510 | 7/1951 | France .................................. 411/161 |
| 711075 | 6/1954 | United Kingdom ................ 411/161 |

*Primary Examiner*—Neill Wilson
*Attorney, Agent, or Firm*—Shapiro and Shapiro

[57] ABSTRACT

For achieving improved securing effect in use with oil or wax coated contact surfaces, a self-locking resilient or non-resilient element, such as a spring-ring or a washer, has wall-like protrusions extending on each major surface from the inner to the outer boundary, and recesses lying therebetween, the protrusions each having a plateau-like upper surface which, viewed in cross-section along the peripheral direction of the element, is curved concavely in order to form edges lying in the region of the plateau boundaries, the edges being formed as scraping edges. The wall-like protrusions extend radially in a zig-zag manner from the inner boundary to the outer boundary of each major surface, and each of the recesses lying between the protrusions forms a zig-zag-shaped continuous channel, open in the region of the inner and outer boundaries in order to achieve a drainage effect.

6 Claims, 4 Drawing Figures

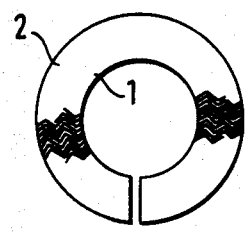
FIG.1
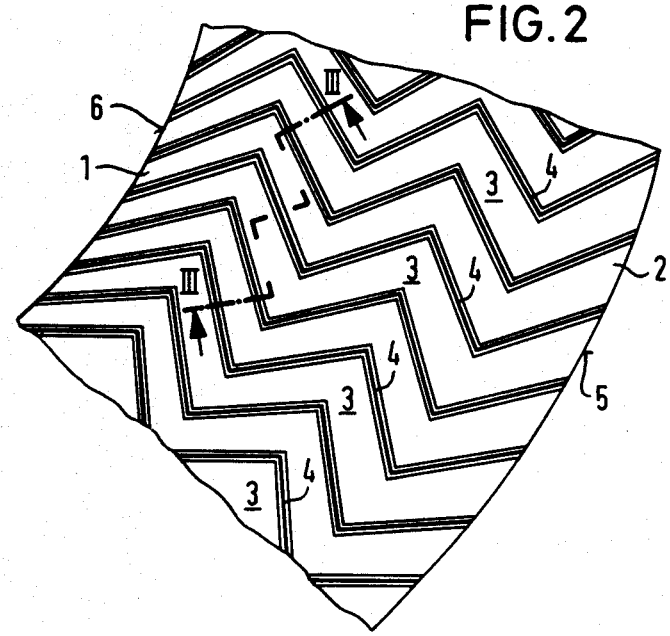
FIG.2
FIG.3
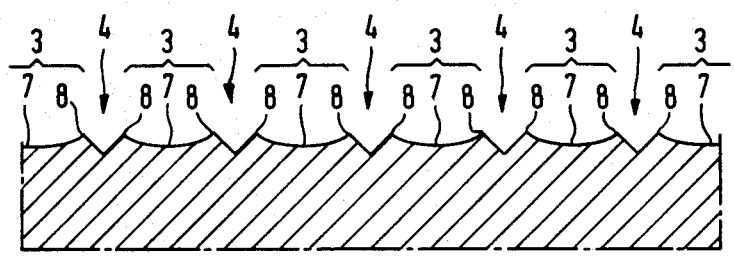

SELF-LOCKING RESILIENT OR NON-RESILIENT ELEMENT

The present invention relates to self-locking resilient or non-resilient elements, such as spring-rings or washers.

A known locking element comprises wall-like protrusions arranged on major surfaces thereof and extending from an inner to an outer border, and recesses lying therebetween. The protrusions have a plateau-like upper surface which, as viewed in cross-section along the peripheral direction of the spring-ring, is concavely curved to form scraping edges lying in the region of the plateau borders.

In elements of this type formed as spring-rings, (cf DE-PS 30 42 388), the wall-like protrusions cross over in a grid pattern and, relative to a tangent to the ring, include an angle substantially larger or smaller than 90°.

In comparison with the precisely radially extending wall-like protrusions of known spring-ring constructions, for the same width of the protrusions this results in longer edge lengths and a more favorable arrangement, and thus in increased resistance.

By forming the edges as scraping edges, the cutting edges, which are often provided with the known spring-ring constructions, can be avoided. As is known, these cutting edges can, to a greater or lesser extent, be squashed flat or broken off during tightening, thus limiting the securing effect. However, when scraping edges are employed, their effective edge borders cannot, owing to the protected arrangement in the region of the plateau borders, either be pressed flat or blunted down during the tightening process. The consequence of this is that the sharpness and effectiveness of the scraping edges are not impaired by the tightening process. Also, during tightening, the opposing contact surface of the screw connection is scraped clean by the scraping edges, and is thus provided with an increased friction coefficient to oppose unscrewing.

On the basis of vibration tests, it was established that spring-rings of this type have a somewhat reduced securing effect when applied against surfaces coated with oil or wax.

An object of the present invention is to create a novel, self-locking, resilient or non-resilient element which, using the securing principle known from DE-PS 30 42 388, provides an improved securing effect when used together with oil or wax coated surfaces.

This object is achieved according to the invention in that the wall-like protrusions extend radially in zig-zag fashion from the inner border to the outer border of each major surface, and that the recesses lying between the protrusions are formed respectively as zig-zag-shaped continuous channels which are open in the region of the inner and outer borders.

The invention is based on the discovery that with the grid-like arrangement of mutually crossing protrusions in the case of spring-rings of the type described in DE-PS 30 42 388, there are formed between the protrusions, as considered in plan view of the spring-ring, rhombic recesses in the middles region and triangular recesses in the border region of the spring-ring, and that whereas each of the triangular recesses arranged in the border region is open towards the peripheral, or, as the case may be, inner surface of the spring-ring, the rhombic recesses lying in the middle region form closed hollows, which become filled with oil or wax when in use against surfaces coated with oil or wax. During tightening of the screw connection, hydrostatic pressure builds up in the recesses or hollows filled with oil or wax, and as a result of this pressure build-up the scraping edges do not fully come into effect. It is true that this hydrostatic pressure can be gradually reduced with the effect of transverse forces. However, as the pressure reduction takes place solely via the abutting surfaces, the entrapped oil or wax is pressed out of the recesses or hollows between the scraping edges, thus somewhat reducing the securing effect in such a situation.

The invention is based on the concept of configuring the construction such that closed recesses are eliminated, whilst maintaining the advantages of the scraping edges in conjunction with their special arrangement. More particularly, the recesses are to be formed as continuous channels which are open in the region of the borders of the major surfaces. By this means, no hydrostatic pressure can build up in the recesses during tightening of the screw connection, as there is a path of escape to the channel ends open to the surrounding atmosphere. Thus, the channels have a certain drainage effect, so that constructions according to the invention provide an increased securing effect even when used in contact with surfaces coated with oil or wax, as has been shown during vibration tests.

The opening of the channels in the region of the inner and outer border of the spring-ring may in principle be achieved in various ways. However, a particularly simple arrangement is provided when the zig-zag-shaped channels in the region of the outer border run directly into the peripheral surface of the spring-ring, and those in the region of the inner border run directly into the inner surface of the spring-ring.

Different widths of channel can be chosen, according to the application concerned. Advantageous results are achieved if the width of the wall-like protrusions—measured in the peripheral direction between the edges—corresponds to the factor of 0.5 to 3 times the width of the channels.

Particularly advantageous results are achieved if the width of the wall-like protrusions—measured between the edges—corresponds to the width of the channels.

It is further advantageous to construct the channels with a substantially V-shaped cross-section. Such a cross-sectional shape is especially suitable for economic manufacture.

In the following discussion, for better understanding and for futher explanation of the invention, as exemplary embodiment will be described in more detail with reference to the accompanying drawing, in which:

FIG. 1 shows a general view of an element according to the invention in the form of a washer, the wall-like protrusions extending from the inner to the outer border, and the channel-like recesses lying therebetween being illustrated only on a part of the major surface, FIG. 2 shows also a plan view of a section of the washer according to FIG. 1, to a greatly enlarged scale, and FIG. 3 shows a section along the plane III—III of FIG. 2, in which, however, only one of the major surfaces of the washer is illustrated.

FIG. 4 shows a section, in a manner similar to FIG. 3, of an alternative embodiment of the invention.

The washer illustrated in the Figures is provided on each of its major surfaces with zig-zag-shaped wall-like protrusions 3, extending radially from the inner border 1 to the outer border 2. Between the wall-like protrusions 3 lie recesses, which are also zig-zag shaped and which are formed as continuous channels 4. In the present exemplary embodiment these channels run, in the region of the outer border 2, into the peripheral surface 5, and in the region of the inner border 1, into the inner surface 6 of the spring-ring.

The wall-like protrusions 3 have a plateau-like upper surface 7, which, in cross-section—when viewed along the peripheral direction of the washer—is concavely curved to provide edges 8 in the region of the plateau borders.

The channels 4 have a V-shaped cross-section and their side surfaces adjoin the edges 8 in such manner that these edges form scraping edges, which, in contrast with the cutting edges of known spring-ring constructions, do not dig into the pressure applying surface during the tightening process, but merely scrape the surface clean, thus resulting in an increased friction coefficient to oppose unscrewing.

The zig-zag shaped wall-like protrusions 3 and the zig-zag shaped channels 4 lying therebetween, when compared with exactly radially extending wall-like protrusions of known spring-ring constructions, result, with identical width, in increased scraping edge lengths in a more favorable arrangement, and thus result in increased resistance to unscrewing.

If an element according to the invention is used in conjunction with oil or wax coated contact surfaces, then the channels 4 become filled with oil or wax during the tightening process. However, as the channels 4 are open, both to the inner border 1 and to the outer border 2 of the element, no hydrostatic pressure can build up in the channels filled with oil, or wax, as the case may be. Rather, superfluous amounts of oil or wax which cannot be received by the cross-section of the channel are pressed out during the tightening process over the inner surface 6 and over the peripheral surface 5. Thus, since no corresponding hydrostatic pressure is built up, no oil or wax escapes from the channels 4 onto the plateau-like upper surfaces 7 between the scraping edges 8. On the contrary, when tightening takes place, oil, or wax as the case may be, is scraped off and the superfluous amount is removed via the channels 4. Subsequently, the contact surface is further cleaned by the scraping edges and levelled off, causing the friction coefficient of the protrusions and thus the unscrewing torque to be increased.

What is claimed is:

1. A self-locking resilient or non-resilient element, such as a spring-ring or a washer, comprising: first and second major surfaces having an inner and an outer boundary; wall-like protrusions arranged on each major surface and extending from the inner to the outer boundary; and recesses lying between said protrusions, wherein said protrusions have plateau-like upper surfaces which are concavely curved as viewed in cross-sections along the circumferential direction of the element to form scraping edges at sides of said upper surfaces, and wherein the wall-like protrusions extend generally radially in zig-zag fashion from the inner boundary to the outer boundary of each major surface, and the recesses lying between said protrusions are formed as zig-zag-shaped continuous channels which are open in the region of the inner and outer boundaries.

2. An element according to claim 1 comprising inner and outer edge surfaces at the inner and outer boundaries, the zig-zag-shaped channels intersecting each edge surface.

3. An element according to claim 1 wherein the width of the wall-like protrusions, measured between said edges, is in the range of from 0.5 to 3 times the width of the channels.

4. An element according to claim 1 wherein the width of the wall-like protrusions, measured between said edges, equals the width of the channels.

5. An element according to claim 1 wherein the channels have a V-shaped cross-section.

6. An element according to claim 1, wherein said protrusions zig-zag in such a manner as to change direction at least twice and wherein said channels zig-zag so as to change direction correspondingly.

* * * * *